United States Patent [19]

Zwiercan et al.

[11] Patent Number: 4,499,116

[45] Date of Patent: Feb. 12, 1985

[54] IMITATION CHEESE PRODUCTS CONTAINING MODIFIED STARCH AS PARTIAL CASEINATE REPLACEMENT AND METHOD OF PREPARATION

[75] Inventors: Gary A. Zwiercan, Knutsford, England; Norman L. Lacourse, Plainsboro; Julianne M. Lenchin, Cranbury, both of N.J.

[73] Assignee: National Starch and Chemical Corporation, Bridgewater, N.J.

[21] Appl. No.: 556,479

[22] Filed: Dec. 2, 1983

Related U.S. Application Data

[63] Continuation-in-part of Ser. No. 455,389, Jan. 3, 1983, abandoned.

[51] Int. Cl.$^3$ .............................................. A23C 20/00
[52] U.S. Cl. ..................................... 426/582; 426/661
[58] Field of Search ............... 426/582, 661, 104, 657

[56] References Cited

U.S. PATENT DOCUMENTS

| | | | |
|---|---|---|---|
| 3,741,774 | 6/1973 | Burkwall | 426/582 |
| 3,917,873 | 11/1975 | Kuroda et al. | 426/568 |
| 3,922,374 | 11/1975 | Bell et al. | 426/582 |
| 4,045,589 | 8/1977 | Petrowski et al. | 426/609 |
| 4,075,360 | 2/1978 | Rule et al. | 426/582 |
| 4,104,413 | 8/1978 | Wynn et al. | 426/582 |
| 4,159,982 | 7/1979 | Hermansson | 260/119 |
| 4,199,608 | 4/1980 | Gilmore et al. | 426/570 |
| 4,207,355 | 6/1980 | Chiu et al. | 426/578 |
| 4,251,556 | 2/1981 | Burkwall, Jr. et al. | 426/332 |
| 4,349,577 | 9/1982 | Tessler | 426/590 |

FOREIGN PATENT DOCUMENTS

| | | |
|---|---|---|
| 456754 | 1/1975 | Australia . |
| 1589775 | 4/1970 | France . |
| 2095139 | 2/1972 | France . |
| 2445840 | 8/1980 | France . |
| 51-77651 | 7/1976 | Japan . |
| 52-108058 | 10/1977 | Japan . |
| 1200396 | 7/1970 | United Kingdom . |
| 2032241 | 5/1980 | United Kingdom . |

OTHER PUBLICATIONS

G. Downey and K. J. Burgess, "Modification of the Aqueous Solubility of Edible Fibers Composed of Casein and Carrageenan", 1979, I. J. Food Sc. Technol. 3, #1, pp. 33–42, (CA93 24650n).

Nahrung 21, #7, p. 617 (CA88 36051y), H. Schmandke and G. Muschiolik, "The Effect of Dialdehyde Starch on the Rehydration of Textured Protein", 1977.

*Primary Examiner*—Arthur L. Corbin
*Attorney, Agent, or Firm*—Edwin M. Szala; Margaret B. Kelley

[57] ABSTRACT

An imitation cheese product, which is functionally equivalent to a caseinate-based imitation cheese product, contains selected edible modified starches as replacements for up to 80% by weight of the caseinate present in the cheese product. Suitable starches include pregelatinized converted starches having a water fluidity (WF) of about 5–90 and an amylose content of at least about 15% to below 40% and selected derivatives and/or crosslinked products thereof. Suitable converted starches include fluidity starches prepared by acid- or enzyme-conversion or oxidized starches prepared by treatment with up to about 2% active chlorine. The starches may be pregelatinized by drum-drying and jet-cooking, or jet-cooking and spray drying.

20 Claims, No Drawings

IMITATION CHEESE PRODUCTS CONTAINING MODIFIED STARCH AS PARTIAL CASEINATE REPLACEMENT AND METHOD OF PREPARATION

This application is a continuation-in-part of Ser. No. 455,389 filed Jan. 3, 1983, now abandoned.

BACKGROUND OF THE INVENTION

This invention relates to the partial replacement of the caseinates present in imitation cheese products, such as cheddar, processed American and especially mozzarella, by selected edible modified starches.

Early attempts to reduce cheese costs led to the development of cheese analogs in which vegetable fat replaced the more costly milk fat. Such analogs were usually manufactured by traditional methods from skim milk containing dispersed vegetable fats and were generally referred to as "filled" cheeses.

Later economic incentives and technical advances led to the development of fabricated cheese analogs manufactured fundamentally from casein or its derivatives, vegetable fats or oils, salts, acids, and flavorings. Since casein derivatives are legally defined as nondairy ingredients, the fabricated analogs were referred to as "imitation" cheeses.

Imitation cheese products include very high-moisture content cheeses such as cream cheese; high moisture content cheeses such as blue cheese and mozzarella, the latter accounting for a major portion of the casein-based imitation cheese market; medium-moisture cheeses, such as cheddar and provolone; low-moisture cheeses, such as romano and parmesan; and pasteurized processed cheeses such as American cheese, cheese spreads and cheese products. These imitation cheese products provide the flavor and functionality of natural cheese at a reduced cost and, in addition, are lower both in calories and cholesterol since the animal fat has been replaced by vegetable fat.

Sodium, potassium, and calcium caseinates, as well as those salts generated in situ by treating acid casein and rennet casein with the appropriate alkali, are used in the preparation of imitation cheese products. Besides providing a major protein source, the caseinates, alone or in combination, possess unique setting, textural and emulsification properties that make them ideal, and their moderately low viscosity permits their use at high solids.

The world supply of casein and caseinates, however, appears to have reached its maximum output. The current high cost and uncertain future availability have become a major concern to food processors. For these reasons, the processors have been trying to find a readily available caseinate substitute, preferably a low cost substitute, to partially or totally replace the caseinates in imitation cheese products. Some attempts have been made to utilize dry vegetable protein isolates (e.g. soy isolates) as replacements. The isolates lack the functionality of the caseinates and have generally only been useful as extenders. The isolates have to be specially treated to provide cheeses with sufficient melt (see U.S. Pat. No. 4,349,576 issued Sept. 14, 1982 to W. F. Lehnhardt et al.) and even then severe shearing during the cheese preparation will substantially reduce the melt value. A recent article in Food Processing (October 1981, pp. 28–29) discloses that a protein mixture (25% casein, 25% soy flour, 25% wheat gluten, and 25% alfalfa protein) is being used with some success in imitation mozzarella cheese; however, the final product does not provide "all desirable characteristics, including flavor".

Thus, there is still a need for a readily available caseinate replacement which will provide the gelling and emulsion-stabilizing properties required during the cheese preparation and which will still provide cheese products having a desirable flavor and textural properties (i.e. especially gel, melt, and shredding and slicing characteristics) comparable to the caseinate-based imitation cheeses.

Flours and starches have been used in various cheese products as thickeners and/or binders as well as to improve specific properties. They have not, however, been used as caseinate replacements to provide the properties typically supplied by the caseinates.

In natural cheese products, for example, cyclodextrin has been added to increase moisture retention and storage life (Jap. Kokai Tokyo Koho 81 75,060); phosphorylated starch (about 2%) has been used as a thickener in blends of Cheshire and Emmenthal cheese to provide a nonstringy product (French Pat. No. 1,570,860); aqueous corn starch mixtures (in place of the previously used milk or butter) have been blended with melted ripe cheese to give a stable soft food product having the consistency of butter (French Pat. No. 1,566,665); starches have been used in processed cheese products prepared from natural cheese, milk powder and other ingredients (Food Engineering, November 1980, p. 25); and pregelatinized corn, potato and tapioca starches have been used as stabilizers (against the deleterious influences of freezing and thawing) in cheese cake and cheese pie fillings (U.S. Pat. No. 3,666,493 issued May 30, 1972 to J. A. Bluemake). In addition, potato starch (3–6%) has been used in admixture with a heated whey solution (65° C.) as a coating to improve the general appearance of hard cheeses (Pol. No. 54,548).

In cheese analogs and simulated cheese products, for example, corn starch hydrolysates (e.g. corn syrup) have been used to bind the water and prevent or retard its loss, as well as to add gloss, palatability, and body texture, to cheese foods based on vegetable oils, animal or vegetable proteins, and emulsifying metal salts (U.S. Pat. No. 3,310,406 issued Mar. 21, 1967 to D. A. Webster); ungelatinized flours (e.g. 3% tapioca flour) have been added, as optional ingredients (0–5%), to a caseinate-containing cheese substitute to aid in the firmness of the cheese substitutes resembling pasta filata or cheddar cheese (Austrian Pat. No. 335,830; Ger. Offen. No. 2,411,945; U.S. Pat. No. 3,922,374 issued Nov. 25, 1975 to R. J. Bell et al.; and U.S. Pat. No. 4,104,413 issued Aug. 1, 1978 to J. D. Wynn et al.); flour and hydrogenated vegetable oils have been used as the matrix in intermediate moisture (about 12%), high flavor-impact cheese analogs containing dehydrated cheese and artificial flavorings which are prepared by homogeneously mixing the components at low temperature and extruding the mass to form rods which are further processed into cubes, strips or grated particles (Food Product Development, June 1980, pp. 42–43); gelatinized high amylose starches and their derivatives have been used as binders for various edible protein pieces in integral simulated cheese products containing no fat (U.S. Pat. No. 3,836,677 issued Sept. 17, 1974 to J. A. Freck et al.); and pregelatinized starches (e.g. corn, wheat, waxy maize and tapioca) have been used in shelf-stable, high protein extruded cheese products prepared from a mixture of cheese, starch, high protein binding agent, water, sugar or sugar equivalents and optionally 1-7% of an edible oil (U.S. Pat. No. 3,741,774 issued June 26, 1973 to M. P. Burkwall).

It is thus an object of the present invention to provide edible modified starches with gelling and emulsion-stabilizing properties for use as partial caseinate replacements in imitation cheeses, especially mozzarella cheese.

SUMMARY OF THE INVENTION

The present invention provides an imitation cheese product containing at least one edible caseinate wherein up to 80% by weight of the caseinate has been replaced by an edible modified starch, the starch-caseinate cheese product being functionally equivalent to the caseinate cheese product, the starch being a pregelatinized converted starch having a water fluidity (WF) of about 5-90 and an amylose content of about 15% to below about 40%, or a derivative thereof prepared by treatment with up to about 10% propylene oxide, up to about 2.0% succinic anhydride, up to about 3.0% octenylsuccinic anhydride, a sufficient amount of acetic anhydride to provide a maximum of about 2.5% bound acetyl, or with a sufficient amount of a sodium or potassium orthophosphate, sodium or potassium tripolyphosphate, or a mixture thereof to provide a maximum of about 0.4% bound phosphate, or a moderatly cross-linked product thereof prepared by treatment with phosphorus oxychloride, epichlorohydrin, sodium trimetaphosphate, or adipic-acetic anhydride, or a derivatized, moderately crosslinked starch, the converted starch being selected from the group consisting of fluidity starches prepared by acid- or enzyme-conversion and oxidized starches prepared by treatment with up to about 2% active chlorine; the treatment percentages being by weight based on the starch.

In a preferred embodiment it provides an imitation cheese product functionally equivalent to a caseinate-based imitation cheese product selected from the group consisting of mozzarella cheese, cheddar cheese, and processed American cheese, which comprises water, an edible vegetable fat or vegetable oil, cheese additives, and a mixture of about 20-80% by weight of sodium and calcium caseinate and about 80-20% by weight of the edible modified starches discussed hereinabove, preferably those having an amylose content of about 20-30% and water fluidity of about 20-80.

In the most preferred embodiment it provides an imitation mozzarella cheese product equivalent or substantially equivalent in shred, melt, and string, wherein the starch is a 20-80 WF corn starch derivative prepared by treatment with about 1-3% octenylsuccinic anhydride, about 0.25-2% propylene oxide, or with a sufficient amount of acetic anhydride (typically about 0.25-3%) to provide about 0.13-1.6% bound acetyl, or a 40-80 WF oxidized potato starch prepared by treatment with about 0.5-1.5% active chlorine, the starch being present in an amount of about 25-50%. The most preferred starch derivative is a 35-50 WF corn starch derivative prepared by treatment with about 1-2% octenylsuccinic anhydride.

It also provides a method for preparing an imitation cheese product from water, a melted vegetable fat or a vegetable oil, an edible caseinate and cheese additives by adding thereto, as a replacement for up to 80% by weight of the caseinate, an edible modified starch, the water and melted fat or oil being gelled and emulsion-stabilized by the caseinate-starch mixture, the starch being selected from the group of edible modified starches discussed hereinabove.

As used herein, the term "imitation cheese" is intended to refer to any cheese analog typically prepared from water, vegetable fats or vegetable oils, caseinates, the edible modified starches described herein, and other typical cheese additives such as natural and/or artificial flavorings, salts (sodium chloride and other salts), acids, colors, emulsifiers, stabilizers, preservatives and optionally other proteins such as vegetable proteins.

DESCRIPTION OF THE PREFERRED EMBODIMENTS

The applicable starch bases which may be used in preparing the pregelatinized, converted starches for use herein as partial caseinate replacements may be derived from any plant source other than waxy starches or high amylose starches having an amylose content of 40% or above. Suitable starches should have an amylose content of about 15% and below 40%, preferably 20-30%, by weight. These include starches such as corn, potato, sweet potato, wheat, rice, sago, tapioca, sorghum, or the like having amylose contents of up to about 30% and starches such as smooth pea, Canadian pea, cocoa bean, winged bean, or the like having amylose contents up to about 40%. Waxy starches such as amioca which contain little or no amylose may be blended with the above amylose-containing starches to provide a useful blend having an amylose content at or above the minimum value.

The starch bases must be converted and pregelatinized to be suitable for use herein. Conversion degrades the starch and reduces the viscosity of the cooked starch dispersions. Slightly stabilized converted starches are preferred, such as the derivatized fluidity starches and the oxidized starches. Stabilization improves the melt of the final cheese product.

Suitable converted starches include acid- or enzyme-converted starches (often referred to as fluidity starches) and oxidized starches (often referred to as chlorinated starches because of the reagent used in their preparation although no chlorine is chemically bound to the starch). The fluidity and oxidized starches should have a water fluidity (WF) of about 5-90, preferably 20-80, and most preferably 40-60. More highly converted starches such as dextrins, even when derivatized, are not suitable for use herein.

In the preparation of the converted starches by acid treatment, the starch base is hydrolyzed in the presence of an acid, such as sulfuric or hydrochloric acid, at a temperature below the gelatinization point of the starch. The starch is slurried in water, and the acid is then added. Typically, the reaction takes place over a 8-16 hr. period, after which the acid is neutralized with alkali (e.g. to a pH of 5.5), and the starch recovered by filtration. The resulting converted starch will require cooking to pregelatinize the starch.

In the preparation of the converted starches by enzyme treatment, the starch base is slurried in water, and the pH is adjusted to about 5.6-5.7 with alkali or acid. A small amount of alpha amylase enzyme (e.g. about 0.02% on the starch) is added to the slurry, which is then heated above the gelatinization point of the starch. When the desired conversion (W.F.) is reached, the pH is adjusted with acid (e.g. to about 2.0) to deactivate the enzyme and held at that pH for a period of at least 10 minutes. Thereafter the pH may be readjusted upward.

The resulting converted starch dispersion is usually jet-cooked to ensure complete solubilization of the starch and deactivation of the residual enzyme.

In the preparation of the converted starches by oxidation with sodium hypochlorite, an aqueous starch suspension (35–44% solids) is usually treated with sodium hypochhlorite solution (containing up to about 2% active chlorine) at pH 8–10 and 21°–38° C. The reaction is neutralized to pH 5–6.5 when the required level of oxidation (degradation) is reached and excess oxidant is destroyed by addition of sodium bisulfite solution or sulfur dioxide. The reaction product is washed to remove impurities, solubilized starch, and by-products of the reaction either on continuous vacuum filters or in hydrocyclones, recovered by filtration, and dried. The hypochlorite oxidizes a limited number of hydroxyl groups to aldehyde, ketone, and carboxyl groups with concomitant cleavage of the glucoside bonds. The introduction of carboxyl groups into the linear amylose molecules reduces the tendency to gel. Such overstabilization must be avoided for converted starches herein and the previously indicated amount of active chlorine should not be exceeded. The resulting converted starch requires further cooking to pregelatinize the starch.

It will be appreciated that, while the above acid- and enzyme-conversions may be carried out on either the derivatized starch or the underivatized starch, it is common practice to use the underivatized starch.

The converted or converted derivatized starches must be pregelatinized to be useful herein and to form a final cheese product having the desired textural properties. Pregelatinized starches are swellable in cold water without cooking. The starches may be pregelatinized by drum-drying starch slurries directly or after cooking (as in a Votator) or by jet-cooking and spray-drying starch slurries. The cooked starch can be dried by means other than spray-drying (i.e. freeze-drying, alcohol precipitation, rotary evaporation). Other means of carrying out the pregelatinization such as extrusion may also be useful herein. The jet-cooked starch slurries, if desired, can be added directly to the cheese formulation.

Drum-drying is a conventional process for simultaneously cooking and drying starch slurries on heated drums and described in such articles as Chapter XXII—"Production and Use of Pregelatinized Starch", Starch: Chemistry and Technology, Vol. II—Industrial Aspects, R. L. Whistler and E. F. Paschall, Editors, Academic Press, New York 1967. Drum-dried starches are in the form of thin, solid sheets which are pulverized prior to use in the cheese formulation.

Jet-cooking and spray-drying are conventional and described in patents such as U.S. Pat. No. 3,674,555 issued July 4, 1972 to G. R. Meyer et al. A starch slurry is pumped into a heated cooking chamber where pressurized steam is injected into the starch slurry. The cooked starch solution passes from the cooking chamber and exits via an exit pipe. The starch solution is atomized by pressurized spray nozzles or centrifugal wheel atomizers into a large, heated chamber where the water is evaporated. The starch passes through a cyclone to separate the heated air from the starch powder. The steam-injection, direct spray-drying process and apparatus described in U.S. Pat. No. 4,280,851 issued July 28, 1981 to E. Pitchon et al. for gelatinizing starch materials, especially high viscosity materials, in the atomized state is also useful herein.

The preferred starches for use herein are the derivatized fluidity starches and the oxidized starches. Suitable derivatives include esters such as the acetate and half-esters such as the succinate and octenylsuccinate prepared by reaction with acetic anhydride, succinic anhydride and octenylsuccinic anhydride respectively; the phosphate derivative prepared by reaction with sodium or potassium orthophosphate or sodium or potassium tripolyphosphate; ethers such as hydroxypropyl ether prepared by reaction with propylene oxide; and any other edible starch derivatives approved for use in food products. The oxidized starches and derivatized fluidity starches show the gelling and emulsion-stabilizing properties which are preferred for cheese products requiring good shredding and melting characteristics, such as mozzarella cheese.

Each derivative should have the proper treatment level, as indicated herein, to provide the required balance between gel strength and melting characteristics. The amounts of derivatizing reagent currently permitted for use in the preparation of food starches may be above those suitable for use herein. For example, currently the Food and Drug Administration permits the use of up to 25 wt.% propylene oxide. Such a treatment level would not be suitable herein as the resulting starch derivative would be overstabilized and would not provide sufficient gel strength to the cheese product. Likewise, the oxidized starches must be treated at active chlorine levels that do not overstabilize the starch.

The practitioner will recognize that there is a relationship between the derivatizing treatment level required and the water fluidity and amylose content of the starch. Converted starches having a lower water fluidity and higher amylose content form stronger gels and vice versa. The practitioner will also recognize that the gel strength required will vary with the cheese type and its moisture content.

The octenylsuccinate derivatives are preferred when better emulsifying properties are required. The practitioner will recognize that the emulsifying properties required will depend not only on the oil content of the cheese product but the amount of caseinate being replaced, with the octenylsuccinate derivative being preferred for caseinate replacement levels above 50%. Their use will prevent unacceptable oil loss during preparation of the cheese and undesirable oiling-off on the surface of the the final cheese product. Some oiling-off in the melted cheese is desirable. The most preferred starch derivative for use in a mozzarella cheese formulation is a jet-cooked or jet-cooked/spray-dried 35–50 WF corn starch derivative treated with 1–2% octenylsuccinic anhydride.

The above starch modification procedures, i.e. conversion, derivatization, and pregelatinization, are conventional and well-known to those skilled in the art and described in such publications as "Handbook of Water-Soluble Gums and Resins", Robert L. Davidson (Editor), Chapter 22: Starch and Its Modifications by M. W. Rutenberg, McGraw Hill Book Co. (New York) 1980.

In the preparation of the modified starches, the conversion is typically carried out prior to the pregelatinization step; however, it is possible to pregelatinize the starch prior to conversion. Likewise typically the conversion and derivatization is carried out prior to pregelatinization; however, this sequence can also be reversed with derivation being carried out prior to conversion.

Highly crosslinked starches generally are not useful herein; for example, a known tapioca-based instant gelling starch that has been highly crosslinked after conversion and then drum-dried is unsatisfactory. However, moderate levels of crosslinking which do not adversely effect the gelling of the converted starches are useful herein.

Crosslinking agents suitable for food starches include phosphorus oxychloride, epichlorohydrin, sodium trimetaphosphate, and adipic acid-acetic anhydride (e.g. 1:4). The currently permitted treatment levels should provide suitable moderately crosslinked starches when crosslinking agents other than phosphorus oxychloride and epichlorohydrin are used. Such levels include up to 0.04% bound (residual) phosphate, calculated as phosphorus, and up to 0.12% adipic anhydride and up to 2.5% bound acetyl. Of the crosslinking agents discussed above, phosphorus oxychloride is preferred in amounts up to about 0.05%, preferably 0.04% or less, most preferably 0.01%. Treatment with higher levels of phosphorus oxychloride (e.g. up to the currently permitted level of 0.1%) provides starches which are too highly crosslinked (i.e. that do not fully cook and/or develop the required viscosity) and formed unacceptable cheese products. Treatment with up to 0.3% epichlorohydrin (the currently permitted level) may likewise provide starches which are too highly crosslinked. The above phosphorus oxychloride and epichlorohydrin treatment levels are for non-derivatized converted starches, and it may be possible to use higher treatment levels (e.g. 0.06% phosphorus oxychloride)) with derivatized starches.

Nonconverted starches (other than the high amylose corn starches which have the required water fluidity without conversion) even when pregelatinized or derivatized and pregelatinized, are not useful herein. The use of granular starches (i.e. not pregelatinized), even when converted or converted and derivatized, are also not useful herein. The above starches do not provide the gelling and/or emulsion-stabilizing properties required in the cheese preparation.

The preparation of the imitation cheeses is conventional and well-known to those skilled in the art. Methods for the preparation of typical cheese products are described in the following patents, whose disclosures are incorporated herein by reference:

U.S. Pat. Nos. 4,232,050 and 4,075,360 (issued Nov. 4, 1980 and Feb. 21, 1978 to C. E. Rule) which disclose methods for the preparation of imitation mozzarella cheeses;

U.S. Pat. No. 4,197,322 (issued Apr. 8, 1980 to J. L. Middleton) which describes the preparation of imitation cheeses such as mozzerella and processed American Cheeses;

U.S. Pat. No. 4,104,413 (issued Aug. 1, 1978 to J. D. Wynn et al.) which describes the preparation of imitation cheeses such as mozzarella and cheddar cheeses;

U.S. Pat. No. 3,922,374 (issued Nov. 25, 1975 To R. J. Bell) which describes a process for the preparation of imitation cheeses such as pasta filata (mozzarella), cheddar, and pasteurized processed American cheeses;

U.S. Pat. No. 3,397,994 (issued Aug. 20, 1968 to G. D. Elenbogen et al.) and U.S. Pat. No. 4,166,142 (issued Aug. 28, 1979 to G. D. Elenbogen) which describe methods for the preparation of imitation cream cheese spread and imitation cheese spreads;

U.S. Pat. No. 3,502,481 (issued Mar. 24, 1970 to J. A. Schaap et al.) which describes the preparation of cheese-like spreads;

U.S. Pat. No. 3,806,606 (issued Apr. 23, 1974 to P. Seiden) which describes the preparation of synthetic cheese having the texture and eating quality of natural dairy cheese; and U.S. Pat. No. 4,110,484 (issued Aug. 29, 1978 to C. E. Rule) which describes a process for the manufacture of acid-set imitation and filled cheese products.

The imitation mozzarella cheeses which are functionally equivalent to the caseinate-based imitation cheeses in flavor, texture, and melt and string are typically prepared from 20 to 24% of a vegetable fat or vegetable oils such as corn, sesame, cottonseed, safflower, groundnut, coconut, soybean, olive, palm kernel, and/or wheatgerm oil; from 20 to 30% of a mixture of 20–80% sodium and calcium caseinates (in a ratio of about 10 to 90 parts sodium caseinate to about 90 to 10 parts calcium caseinate) and 80–20% modified starch; about 42 to 50% water; about 0.5 to 3.0% sodium chloride; about 0.8 to 2.5% trisodium phosphate, sodium aluminum phosphate, and/or calcium phosphate; 0.5 to 2.0% adipic, lactic and/or sorbic acid; and 0.0001 to 1% cheese additives such as butter flavoring; the percentages being by weight.

In imitation mozzarella cheese a mixture of sodium and calcium caseinate is used to provide the final stretch, emulsifying, gel and melt properties. Both high sodium and high calcium caseinate systems are useful with the modified starches herein. The solubilized caseinates may be formed in situ by adding an alkali such as sodium, potassium or calcium hydroxide to dispersions of acid casein (precipitated from milk by the addition of an acid such as hydrochloric or lactic acid) or rennet casein (casein solubilized by reaction with the enzyme rennet).

It is surprising that these modified starches can be used as a replacement for all types of caseinates and provide a functionally equivalent imitation cheese product. It is even more surprising that one modified starch can be used even in a cheese such as mozzarella that typically requires a protein mixture (e.g. sodium and calcium caseinate) to provide the shredding, melting and stringing properties of the natural cheese.

Typically, the above cheeses are prepared by forming an emulsion of the caseinates, starch, and water with the melted fat or oil and adding the salts and acids at the appropriate times. The mixture is heated during the emulsification and the final plastic mass is compressed and refrigerated for several days.

Imitation processed American and cheddar cheeses have a similar composition except that different salt(s) or acid(s) are used.

In the examples which follow, all parts and percentages are given by weight and all temperatures are in degrees Celsius unless otherwise noted. The following testing procedures are used in the examples to characterize the starch products herein.

WATER FLUIDITY MEASUREMENT

The water fluidity of the starches is measured using a Thomas Rotational Shear-Type Viscometer (manufactured by Arthur H. Thomas Co., Philadelphia, PA 19106), standardized at 30° C. with a standard oil having a viscosity of 24.73 cps., which oil requires 23.12±0.05 sec. for 100 revolutions. Accurate and reproducible measurements of the water fluidity are obtained by determining the time which elapses for 100 revolutions at different solids levels depending on the starch's degree of conversion (as conversion increases, the viscosity decreases). The procedure used involves slurrying the required amount of starch (e.g., 6.16 g. dry basis) in 100 ml. of distilled water in a covered copper cup and heating the slurry in a boiling water bath for 30 min. with occasional stirring. The starch dispersion is then brought to the final weight (e.g. 107 g.) with distilled water. The time required for 100 revolutions of the resultant dispersion at 81°–83° C. is recorded and converted to a water fluidity number as defined in the table below.

| Amount of Starch Used (anhydrous, g.) | | | | |
|---|---|---|---|---|
| 6.16[a] | 8.80[b] | 11.44[c] | 13.20[d] | |
| Time required for 100 revolutions (sec.) | | | | Water Fluidity |
| 60.0 | | | | 5 |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |
| | | | 13.5 | 75 |
| | | | 11.5 | 80 |
| | | | 10.0 | 85 |
| | | | 9.0 | 90 |

[a], [b], [c] and [d] Final weight of starch solutions are 107, 110, 113, and 115 g., respectively.

CHEESE EVALUATION

The cheeses were evaluated for gel strength, emulsion stability during preparation (oil retention or oil loss) and after preparation (oil retention or oiling-off on the cheese surface), and stretch properties by touching and pulling the cheese; for shred by grating the cheese; for melt by heating the grated cheese on a pizza and observing the melt characteristics, i.e. fusion, lack of fusion, or excessive fusion (too much melting resulting in a translucent layer), as well as excessive oil in the melt; and for string by pulling the melted cheese apart. The cheeses were given an overall rating based on the above properties with cheeses which lost oil during their preparation being given a rating of zero. Gel strength and shred were considered the next most important properties. All of the cheeses evaluated were satisfactory in flavor and mouthfeel. A rating below 5 was considered unsatisfactory. The control cheeses were given an automatic rating of 10 even though the high sodium caseinate formulation was inferior to the high calcium caseinate formulation in string, melt, and stretch. Acceptable cheeses (i.e. functionally equivalent) had a rating of at least 5, with the substantially equivalent and equivalent mozzarella cheeses having ratings of 8–9.5.

EXAMPLE I

This example describes the preparation of imitation mozzarella cheeses, based on high sodium and high calcium caseinate formulations, containing jet-cooked/-spray-dried 40 WF corn starch octenylsuccinate derivatives at 50% replacement.

PREPARATION OF THE MODIFIED STARCH

A slurry of 100 parts of granular corn starch in 150 parts of water was heated in a water bath of 52° C., 0.5 parts of hydrochloric acid were added, and the mixture was stirred for 16 hours at 52° C. The hydrolysis was stopped by neutralizing the mixture with alkali (a solution of 3% sodium hydroxide) to a pH of 5.5. The converted starch was recovered by filtration, washed and dried; it showed a water-fluidity of 40, as measured by the test procedure described above.

A total of 100 parts of the converted starch was slurried in 150 parts of water, the pH was adjusted to 7.5 with sodium hydroxide, and the indicated amount (1% and 3%) of octenylsuccinic anhydride (OSA) was added slowly while the pH was maintained at 7.5 with sodium hydroxide. The reaction was complete when no further addition of alkali was necessary. The pH was then adjusted to 5.5 with acid. The resulting octenylsuccinate derivatives were recovered by filtration and washed.

A total of 100 parts of the derivatized starch was then slurried in 233 parts of water and passed through a continuous steam jet-cooker at 138° C. The resulting starch solution was spray-dried at a chamber temperature of 210° C. and an outlet temperature of 90° C.

PREPARATION OF THE CHEESES

The cheeses were prepared by dry blending the caseinates (control cheese) or caseinates and starch (replacement cheese) at low speed in a Hobart mixer. The melted shortening or oil was blended in and mixing was continued for 3 minutes. About ½ of the mixture was removed and, while continuing agitation, about 85% of the water was added. Mixing was continued for about 1 minute until the emulsion was homogeneous. The removed shortening/caseinate/starch mixture was added and agitation was continued for about 2 minutes. Sorbic acid and the setting salts were then added at medium speed and mixing was continued until the mixture was homogeneous. The adipic acid and remaining water were added and mixed in. The resulting cheeses were removed, pressed slightly to firm the mixture, and refrigerated at 4° C. (40° F.) for 1–3 days. The laboratory preparation, wherein the remaining water is post-added after the sorbic acid and setting salts, simulates a typical commercial preparation wherein steam is injected into the final mixture after the acid and salt addition.

The control cheeses and cheeses containing the modified starches were formulated as follows:

| Ingredient (parts) | Cheese Formulation[a] | | Cheese Formulation[b] | |
|---|---|---|---|---|
| | (Control) | (Starch Replacement) | (Control) | (Starch Replacement) |
| Sodium Caseinate | 21.2 | 10.6 | 5.4 | 2.7 |
| Calcium Caseinate | 5.4 | 2.7 | 21.2 | 10.6 |
| Modified Starch[c] | — | 13.3 | — | 13.3 |
| Shortening | 22.8 | 22.8 | 22.6 | 22.6 |
| Sodium Chloride | 0.9 | 0.9 | 0.9 | 0.9 |
| Trisodium Phosphate | 0.3 | 0.3 | 0.3 | 0.3 |
| Sodium Aluminum Phosphate | 0.3 | 0.3 | 0.3 | 0.3 |
| Calcium Phosphate | 0.3 | 0.3 | 0.3 | 0.3 |
| Adipic Acid | 0.3 | 0.3 | 0.3 | 0.3 |
| Sorbic Acid | 0.3 | 0.3 | 0.3 | 0.3 |
| Water | 48.5 | 48.5 | 48.5 | 48.5 |
| | 100.3 | 100.3 | 100.1 | 100.1 |

[a] High Sodium Caseinate - 70%/30% Na/Ca caseinate
[b] High Calcium Caseinate - 70%/30% Ca/Na caseinate
[c] 40 WF Corn; 1% & 3% OSA; jet-cooked (JC)/spray-dried (SD).

The cheese evaluations are summarized in Table I.

The results show that, in the high sodium caseinate cheese formulation, the product containing the modified starch was better than the control in stretch, string, and melt but poorer in gel strength. In the high calcium caseinate cheese formulation, the products containing the starch were both excellent, with the 1% OSA derivative being better in shred but poorer in melt than the 3% OSA derivative. The high caseinate control was only slightly better in one property (i.e. shred). It is thus demonstrated that the imitation mozzarella cheese products containing the modified starches as partial replacements for both sodium and calcium caseinate were functionally equivalent to the controls for both the high sodium and high calcium caseinate cheese formulations. Similar cheese products were prepared using olive oil, partially hydrogenated soy bean oil, and various solidified hydrogenated vegetable oils with comparable results.

EXAMPLE II

This example demonstrates the use of starches prepared from other starch bases, as well as the use of starches of varying water fluidities as caseinate replacements.

The derivatized starches were treated with 3% OSA and jet-cooked

TABLE I

| Cheese | Caseinate Replacement Level (%) | Gel | Shred | Emulsion Stability | String | Melt | Stretch | Overall[e] Rating |
|---|---|---|---|---|---|---|---|---|
| High Na Caseinate Control | 0% | Firm | V. Good | V. Good | Poor[d] | Poor[c] | Poor[d] | 10 |
| High Na Caseinate/Starch[a] | 50% | Soft | Good | Good | Good | Good | Good | 8 |
| High Ca Caseinate Control | 0% | Firm | V. Good | Good | Good | Good | Good | 10 |
| High Ca Casinate/Starch[a] | 50% | Firm | Fair | Good | Good | Good | V. Good | 8 |
| High Ca Casinate/Starch[b] | 50% | Firm | Good | Good | Good | Good | Good | 9 |

[a] 40 WF Corn; 3% OSA; JC/SD
[b] 40 WF Corn; 1% OSA; JC/SD
[c] No fusion of grated cheese pieces
[d] Too short
[e] The controls were given an automatic rating of 10 despite the differences in the properties of the high sodium and high calcium caseinate cheeses.

and spray-dried according to the procedure described in Example I. The non-derivatized starches were jet-cooked and used directly in the formulation; in these cheese formulations the added water was adjusted to provide the required starch solids content. They were evaluated in the above high calcium caseinate cheese formulation at a 50% replacement level. The overall rating of the various replacement starches are summarized below.

| Starch[a] | Cheese Overall Rating |
|---|---|
| 40 WF Corn; JC | 7 |
| 20 WF Corn; 3% OSA; JC/SD | 8 |
| 80 WF Corn; 3% OSA; JC/SC | 7 |
| 40 WF Potato; JC | 7.5 |
| 20 WF Potato; 3% OSA; JC/SD | 7 |
| 80 WF Potato; 3% OSA; JC/SD | 0 |
| 40 WF Tapioca; JC | 7 |
| 20 WF Tapioca; 3% OSA; JC/SD | 6 |
| 80 WF Tapioca; 3% OSA, JC/SD | 0 |
| 40 WF Amioca; JC | 2 |
| 20 WF Amioca; 3% OSA; JC/SD | 4 |
| 80 WF Amioca; 3% OSA; JC/SD | 0 |

[a] The amylose content of the starches was about 21–28% for corn, 23% for potato, 17–22% for tapioca, and <1% for Amioca (a waxy maize starch).

The results show that the products containing the non-derivatized starches were good for all bases except Amioca. The cheeses had the following properties: firm gel; good shred and emulsion; and fair to good stretch, string, and melt.

The results also show that the products containing the starch derivatives based on Amioca were likewise unacceptable (ratings of 4 and 0); the gel was very soft, the shred was fair to poor (matted) and, in addition, the 80 WF derivative lost considerable oil (50 cc).

The results further show that potato and tapioca starch derivatives having high viscosities (20 WF) were satisfactory. The 20 WF potato and tapioca starch derivatives provided products which were slightly softer in gel and somewhat poorer in shred than the product prepared with the 20 WF corn starch derivative. The 80 WF starch derivatives all gave cheese products with slightly softer gels, and the products containing the potato and tapioca starch derivatives were unacceptable having oil losses of 45 and 41 cc, respectively. The cheese prepared with the 80 WF corn derivative did not lose oil.

EXAMPLE III

This example demonstrates the effect of derivatization (type and amount) on the starches.

PART A

Various starch derivatives having approximately the same degree of substitution (about 0.0078) were prepared using the indicated amounts of derivatizing reagent to treat a 40 WF fluidity corn starch. The derivatives were jet-cooked and spray-dried as before and evaluated at a 50% replacement level in the high calcium caseinate cheese formulation. The overall ratings are shown below.

| Modified Starch | Overall Cheese Rating |
|---|---|
| 40 WF Corn; 1% OSA; JC/SD[a] | 9 |
| 40 WF Corn; 0.28% PO; JC/SD[b] | 6 |
| 40 WF Corn; 0.50% Ac$_2$O; JC/SD[c] | 5 |
| 40 WF Corn; JC/SD | 7 |

[a] The derivative was prepared using the indicated amount of octehylsuccinic anhydride as described in Example I.
[b] The derivative was prepared by slurrying 100 parts of the starch into a solution 30 parts sodium sulfate in 150 parts water, adding 1.5 parts sodium hydroxide, and then adding indicated amount of propylene oxide (PO). The slurry was agitated for 16 hours at 40° C. in a sealed vessel. When the reaction was completed, the pH was adjusted to 5.5 with acid. The derivative was recovered by filtration, washed, and air dried.
[c] The derivative was prepared by slurrying 100 parts of the starch in 150 parts water, adjusting the pH to 8.3 with 3% sodium hydroxide solution, and slowly adding the indicated amount of acetic anhydride (Ac$_2$O) while maintaining pH at 8.3 with the above alkali; the pH was then adjusted to 5.5 with acid. The reaction was complete when no further addition of alkali was necessary. The derivative was recovered as hereinabove.

The results show that all the derivatives gave acceptable products with the octenylsuccinate being the best. The acetate and hydroxypropyl starch derivatives formed products with softer gels but no oil loss occurred. Their shredding characteristics were poor (matting) in comparison with the product containing the octenylsuccinate starch derivative. The products also showed too much melt. The results also show that the non-derivatized converted starch gave a product which was acceptable (firm gel; fair emulsion, stretch, and string; good shred; fair melt). It would appear the non-derivatized, converted starches will be most useful in cheeses requiring good gel strength and shred rather than cheeses such as mozzarella which have rigid melting requirements including string.

PART B

Various octenylsuccinate derivatives were prepared using the indicated amounts of octenylsuccinic anhydride to treat both high viscosity (20 WF) and low viscosity (80 WF) fluidity corn starches. The derivatized starches and the non-derivatized 20 WF starch were jet-cooked and spray dried as above; the 80 WF corn was jet-cooked at the indicated temperature and used without spray-drying as described in Example II. The starches were evaluated at a 50% replacement level in the high calcium caseinate cheese formulation. The overall ratings are given in Table II.

The results show that the 20 WF starches gave acceptable cheese products with firm gels and good shredding characteristics. Treating the starches with low levels of OSA improved the cheese properties. However, increasing the treatment level to 3% OSA adversely affected both the melt (excessive fusion) and the string (fair) and shred (good

TABLE II

| Starch | Gel | Shred | Emulsion Stability | String | Melt | Stretch | Overall Rating |
|---|---|---|---|---|---|---|---|
| 20 WF Corn; JC/SD | Firm | Good | Poor* | Poor | Poor | Poor | 5 |
| 20 WF Corn; 0.5% OSA; JC/SD | Firm | Good | Good | Fair | Fair | Fair | 9 |
| 20 WF Corn; 1.0% OSA; JC/SD | Firm** | Good | Good | Good | Good | Good | 8.5 |
| 20 WF Corn; 2.0% OSA; JC/SD | Firm** | Good | Good | Good | Good | Good | 8 |
| 20 WF Corn; 3.0% OSA; JC/SD | Soft | Fair-Good | Good | Fair | Poor*** | Good | 5 |
| 80 WF Corn; JC at 300° F./SD | Soft | Poor | Poor**** | Good | Excellent | Good | 0 |
| 80 WF Corn; 0.25% OSA; JC at 300° F./SD | Soft | Poor | Poor**** | Good | Excellent | Good | 0 |
| 80 WF Corn; 1.00% OSA; JC at 300° F./SD | Soft | Poor | Good | Good | Excellent | Good | 5 |

*Oil off on the cheese surface after storage.
**The gels of the cheeses containing the 1% and 2% OSA starch derivatives were slightly less firm and less firm than those of the cheese containing the 0.5% OSA starch derivative and hence the products were given slightly lower overall ratings.
***Fused too well, runny & transparent.
****40 cc oil loss with no OSA; 20 cc oil loss with 0.25% OSA vs. no oil loss with 1.00% OSA.

to fair). As the OSA treatment level was increased from 0.5% to 1% the stretch, string, and melt improved from fair to good. The non-derivatized 20 WF starch gave an acceptable cheese product which was good in shred but poor in emulsion, stretch, string and melt.

The results further show that derivatization with a high enough level of octenylsuccinic anhydride (1%) improved the overall rating (0 to 5) for the cheese containing the spray-dried 80 WF starch. Specifically, the oil loss was eliminated even though the gel strength remained unchanged. The cheeses containing the derivatized 80 WF starches had soft rather than firm gels; they were better in melt (excellent vs. good) but poorer in shred (poor vs. very good) than the control cheese (see Example I).

The above results indicate that the octenylsuccinate modified starches serve a dual purpose in the cheese, i.e. they stabilize the amylose to improve melt quality and more importantly they aid in the emulsification of the fat during the cheese preparation. Hence, these derivatives are preferred if both emulsification and meltability must be improved. They are also preferred for caseinate replacement levels above 50% and preferred for cheeses, such as mozzarella.

EXAMPLE IV

This example shows the use of oxidized starches and mildly cross-linked derivatized starches as caseinate replacements in the high calcium caseinate cheese formulation. It also establishes the maximum active chlorine level acceptable in the oxidative treatment and the maximum phosphorus oxychloride treatment levels for the crosslinked derivatized starches.

PART A

The starches were prepared by slurrying 100 parts of the starch in 150 parts water and adjusting the pH to 5.5 with acid or alkali. The starch slurry was placed in insulated jars and the alkaline sodium hypochlorite solution containing the indicated level of active chlorine was slowly added over a 90 minute period. The reaction was carried out over a 16 hour period at room temperature. Any excess chlorine was neutralized with a solution of sodium bisulfite, the pH was adjusted to 5.5 with acid, and the oxidized starch was recovered by filtration, washed, and dried. The water fluidity of the oxidized starches is given below. The cheese evaluation results were as follows:

| Starch (19% solids in the cheese) | Replacement Level | Overall Rating |
|---|---|---|
| 42 WF Potato; 0.5% Cl$_2$ | 50% | 8.5 |
| 78 WF Potato; 1.5% Cl$_2$ | 50% | 8 |
| 84 WF Potato; 2.5% Cl$_2$ | 50% | 4 |
| 84 WF Potato; 3.5% Cl$_2$ | 50% | 3 |

The results show that when the oxidized starches were not overstabilized they gave good products. The 42 WF starch gave a firm gel, good emulsion, good shred, fair stretch, and good melt. The 78 WF starch was slightly softer in gel strength and slightly better in melt and stretch. The higher fluidity starches, even though they lost no oil, had soft gels with very poor shredding (wet matter) and poor melting (excessive fusion) characteristics.

PART B

The starches were prepared by slurrying 100 parts of the starch in 150 parts water and adding 0.8% sodium hydroxide and 1% sodium chloride (based on the dry starch) and the indicated amount of phosphorus oxychloride. The reaction was carried out over a 3 hour period at room temperature, the pH was adjusted to 5.5 with acid, and the crosslinked starch was recovered by filtration, washed, and dried. The crosslinked starches were modified by treatment with the indicated amount of OSA as in Example I but were used directly after jet-cooking (without spray-drying) in the cheeses. The cheese evaluation results were as follows:

| Starch (19% solids in the cheese) | Replacement Level | Overall Rating |
|---|---|---|
| 67 WF corn; 0.01% POCl₃ 1.5% OSA; (final WF 40); JC | 50% | 8.5 |
| 67 WF corn; 0.05% POCl₃ 1.5% OSA; (final WF 20); JC | 50% | 6 |
| 70 WF corn; 0.07% POCl₃ 1.5% OSA; (final WF 25); JC | 50% | 2 |
| 70 WF corn; 0.10% POCl₃ 1.5% OSA (final WF 31); JC | 50% | 4 |

The results show that the crosslinked derivatized starches gave acceptable cheese products provided the treatment level was below 0.07%.

PART C

The starch evaluated was a lightly converted, lightly crosslinked, drum-dried (DD) starch. The cheese evaluation results were as follows:

| Modified Starch | Replacement Level | Overall Cheese Rating |
|---|---|---|
| 27 WF Tapioca; 0.015% POCl₃; DD | 30% | 7 |
| 27 WF Tapioca; 0.015% POCl₃; DD | 50% | 4 |

The results show that at 30% replacement an acceptable cheese could be prepared. At 50% replacement the cheese was unacceptable; however, at this level the use of a more highly converted (higher WF) crosslinked starch would likely provide an acceptable cheese with a firmer gel and better shred.

EXAMPLE V

This example demonstrates that the modified starch (40 WF corn, 1% OSA) must be pregelatinized.

The starches evaluated (50% replacement in the high calcium caseinate cheese formulation) included the converted, derivatized starch in the granular state and in the pregelatinized dry form. The overall rating of the cheeses are given below.

| Modified Starch | Overall Cheese Rating |
|---|---|
| 40 WF Corn; 1% OSA (granular) | 4 |
| 40 WF Corn; 1% OSA; DD | 7 |
| 40 WF Corn, 1% OSA; JC/SD | 8 |

The results show that the granular starch gave an unacceptable cheese product. Even though the gel was firm and the emulsion, stretch and string were good, the product's texture was poor (i.e. grainy) and, in addition, the melt and shred were only fair. In comparison, all of the cheeses containing pregelatinized modified starches were acceptable. The cheese containing the drum-dried (D.D.) starch was almost as good as that containing the jet-cooked/spray-dried starch (the gel, emulsion, and shred were good for both cheeses but the strength, string, and melt were only fair with the drum-dried starch). See Example I for the specific properties of the Control cheese and the product containing 40 WF Corn; 1% OSA; JC/SD starch as the caseinate replacement.

EXAMPLE VI

This example shows the influence of starch amylose content on the cheese properties. The blends were formulated from a 40 WF Amioca (approximately 0% amylose) and 40 WF corn (approximately 27% amylose) to give the indicated amylose content. They were evaluated at 50% replacein the high calcium caseinate formulation. For comparison, the results obtained using a jet cooked 40 WF Amioca are included.

| Starch Modification/Blend | Amylose Content (%)* | Overall Cheese Rating |
|---|---|---|
| 40 WF Amioca; JC | 0 | 2 |
| 40 WF Amioca/40 WF Corn; JC | 5 | 3 |
| 40 WF Amioca/40 WF Corn; JC | 10 | 4 |
| 40 WF Amioca/40 WF Corn; JC | 15 | 5 |
| 40 WF Amioca/40 WF Corn; JC | 20 | 7 |

*Approximate

The results show that there is a minimum amylose content (above 10%) that must be present to provide an acceptable cheese product and that blends having this amylose content are useful herein. The cheese product prepared with the 40 WF Amioca had a very soft gel, very poor shred (matting) and poor melt (excessive). At 5% amylose the melt was improved (not as runny), but the gel and shred were still very poor. At 10% amylose the product began to resemble cheese; the melt was good but the gel was still poor and matting was still a problem. At 15% amylose melt was good, gel and shred were acceptable, but string had been reduced from good to fair. At 20% amylose the gel strength was very firm (firmer than the control cheese), shred was excellent, but melt and string were only fair.

EXAMPLE VII

This example shows the use of the octenylsuccinate starch derivative at various replacement levels in the high calcium caseinate cheese formulation. The overall rating for the cheeses was as follows:

| Modified Starch | Replacement Level | Overall Cheese Rating |
|---|---|---|
| 40 WF Corn; 1% OSA; JC/SD | 25% | 9.5 |
| 40 WF Corn; 1% OSA; JC/SD | 50% | 9 |
| 40 WF Corn; 1% OSA; JC/SD | 75% | 7 |
| 40 WF Corn; 1% OSA; JC/SD | 100% | 3 |

The results show that at 25% replacement the cheese was equivalent to the control cheese (see Example I) in all properties (firm gel; very good shred; good melt; and good string). At 50% replacement the cheese was excellent and functionally equivalent; it was only slightly inferior in shred (good vs. very good). At 75% replacement the cheese was still very good and nearly equivalent (slightly soft gel; good stretch; fair shred with some matting; and fair melt). At 100% replacement the cheese-like product formed was unacceptable; it was crumbly and poor in all properties

EXAMPLE VIII

This example illustrates the use of the preferred caseinate-replacement starch at 50% replacement in other cheese formulations. The control cheeses and starch-containing cheeses were formulated as in Example I using the following ingredients:

spray-dried corn dextrins, and spray-dried OSA corn dextrin derivatives. They were evaluated at 50% replacement in the high calcium caseinate mozzarella cheese formulation.

TABLE III

| Imitation Cheese | (type) | Gel | Shred | Emulsion Stability | String | Melt | Stretch | Overall Rating |
|---|---|---|---|---|---|---|---|---|
| Control | (Mozzarella) | Firm | Good | Good | Good | Good | Good | 10 |
| Replacement | (Mozzarella) | Firm | Good | Good | Good | Good | Good | 8 |
| Control | (American) | Firm | None | Excelent | Good | Excellent | None | 10 |
| Replacement | (American) | Sl. Soft | None | Good | Good | Good | None | 7 |
| Control | (Cheddar) | V. Firm | None | Fair | Fair | Good | None | 10 |
| Replacement | (Cheddar) | Sl. Soft | Fair | Fair | Fair | Good | Good | 6 |

TABLE IV

| | | | Cheese Properties | | | | |
|---|---|---|---|---|---|---|---|
| Modified Starch | Gel | Shred | Emulsion Stability (c.c. oil loss) | Stretch | Melt | String | Overall Rating |
| Corn; 1% OSA; JC/SD | V. Soft | Poor (matts) | Poor (20) | Poor | Poor | Poor | 0 |
| 20 WF Corn; 1% OSA; JC/SD | Sl. Soft | Fair | Good | Fair | Fair | Fair | 7 |
| 40 WF Corn; 1% OSA; JC/SD | Firm | Good | Good | Good | Good | Good | 9 |
| 60 WF Corn; 1% OSA; JC/SD | Sl. Soft | Fair | Good | Excellent | Excellent | Excellent | 6 |
| 80 WF Corn; 1% OSA; JC/SD | Poor | Poor | Good | Good | Good | Good | 5 |
| Corn Dextrin; Low Conversion[a] | V. Soft | Poor | Poor (36) | Fair | Good | Fair | 0 |
| Corn Dextrin; Medium Conversion[b] | V. Soft | Poor | Poor (50) | Fair | Good | Fair | 0 |
| Corn Dextrin; High Conversion[b] | V. Soft | Poor | Poor (62) | Fair | Good | Fair | 0 |
| Corn Dextrin; Low Conversion; 3% OSA[a] | V. Soft[c] | Poor | Poor (30) | Poor | Fair | Poor | 0 |
| Corn Dextrin; Medium Conversion; 3% OSA[b] | V. Soft[c] | Poor | Poor (40) | Poor | Fair | Poor | 0 |
| Corn Dextrin; High Conversion; 3% OSA[b] | V. Soft[c] | Poor | Poor (50) | Poor | Fair | Poor | 0 |

[a] Corn dextrin and derivatized corn dextrin (spray-dried) having water fluidities of 80 WF.
[b] Medium and high conversion corn dextrins and derivatized corn dextrins (spray-dried) which were even lower in viscosity than the low conversion dextrins; their water fluidities could not be determined.
[c] Softer than the non-derivatized spray-dried corn dextrins of comparable viscosities.

| Ingredient (parts) | Imitation Processed American Cheese | | Imitation Cheddar Cheese | |
|---|---|---|---|---|
| | (Control) | (Replacement) | (Control) | (Replacement) |
| Calcium caseinate | 20.0 | 10.0 | 21.0 | 10.5 |
| Sodium caseinate | 5.0 | 2.5 | 5.0 | 2.5 |
| Modified starch* | — | 12.5 | — | 13.0 |
| Shortening | 28.1 | 28.1 | 32.3 | 32.3 |
| Salt | 2.0 | 2.0 | 2.2 | 2.2 |
| Sodium aluminum phosphate | 0.9 | 0.9 | 0.5 | 0.9 |
| Citric acid | 0.5 | 0.5 | 0.9 | 0.5 |
| Sodium citrate | 0.2 | 0.2 | 0.4 | 0.4 |
| Cheese flavoring | — | — | — | — |
| Cheese coloring | — | — | — | — |
| Water | 43.3 | 43.3 | 37.6 | 37.6 |
| | 100.0 | 100.0 | 100.0 | 100.0 |

*40 WF Corn; 1% OSA; JC/SD

The cheeses were evaluated as before; the rating of the imitation and replacement mozzarella cheeses are included for comparison with the results given in Table III.

The results show that the caseinate-replacement starch can be used in other types of imitation cheeses to give an acceptable product.

EXAMPLE IX

This example shows the effect of starch viscosity and demonstrates that dextrins and non-converted starch can not be used in the formulations.

The starches evaluated included fluidity corn starch derivatives, a non-converted OSA starch derivative, The cheese properties and ratings are given in Table IV.

The results show that to obtain the best gel strength for the cheese it is necessary to lower the molecular weight of the starch by conversion. This is demonstrated by the fact that the gel of the nonconverted octenylsuccinate derivative was very soft and an oil loss of 20 cc. resulted. The cheese was unacceptable in both its properties and because of this oil loss. The fluidity (converted) starches all produced acceptable cheese products with the 40 WF starch showing the firmest gel and best overall properties.

The corn dextrins and OSA-derivatized corn dextrins gave unacceptable cheese products with a very soft gel, unacceptable oil losses (36–62 cc), and fair to poor cheese characteristics.

EXAMPLE X

This example demonstrates that not all pregelatinized starches can be used as caseinate replacements even though they may be known to have gelling properties. The starches evaluated at 50% replacement in the high calcium caseinate cheese formulation included an overstabilized crosslinked tapioca starch (7.5% propylene oxide) known to be useful as a gelling agent in puddings and pie fillings and an overstabilized tapioca starch (above 2% available chlorine) having the required WF. The overall cheese ratings are given below.

| Modified Starch | Cheese Rating |
|---|---|
| Tapioca treated with 7.5% propylene oxide; crosslinked with 0.008% phosphorus oxychloride; drum dried | 0 |
| Tapioca oxidized with 3.5% available chlorine; | 4 |

| Modified Starch | Cheese Rating |
|---|---|
| derivatized with 5% acetic anhydride; jet-cooked and spray-dried. | |

The results show that the overstabilized lightly crosslinked starch is not suitable for use herein. The cheese prepared using this nonconverted starch lost 20 cc. of oil; the gel was very soft; and the shred was not only matted but bready. The results also show that overstabilized oxidized starches (80WF) are not suitable for use herein. The resulting cheese had a very soft gel; the shred matted; and the melt was only fair (too much oil release).

Summarizing, this invention is seen to provide imitation cheese products functionally equivalent to caseinate-based imitation cheese products which contain selected modified starches as a partial replacement for the caseinates. It also provides an imitation mozzarella cheese containing a converted octenylsuccinate corn starch which is equivalent in such properties as shred, melt, and string.

Now that the preferred embodiments of the present invention have been described in detail, various modifications and improvements thereon will become readily apparent to those skilled in the art. Accordingly, the spirit and scope of the invention are to be limited only by the appended claims and not by the foregoing specification.

What is claimed is:

1. An imitation cheese product containing at least one edible caseinate, wherein the improvement comprises the replacement of part of the caseinate, in an amount up to about 80% by weight, with an edible modified starch, the starch-caseinate cheese product being functionally equivalent to the caseinate cheese product; the starch being a pregelatinized converted starch having a water fluidity (WF) of about 5–90 and an amylose content of about 15% to below about 40% by weight; a derivative thereof prepared by treatment of the starch with up to about 10% propylene oxide, up to about 2% succinic anhydride, up to about 3% octenylsuccinic anhydride, a sufficient amount of acetic anhydride to provide a maximum of about 2.5% bound acetyl, or a sufficient amount of sodium or potassium orthophosphate, sodium or potassium tripolyphosphate, or mixture thereof to provide a maximum of about 0.4% bound phosphate; or a moderately crosslinked product thereof prepared by treatment of the starch with phosphorus oxychloride, epichlorohydrin, sodium trimetaphosphate, or adipic-acetic anhydride; or a derivatized moderately crosslinked starch; the converted starch being a fluidity starch prepared by acid- or enzyme-conversion of the starch or an oxidized starch prepared by treatment of the starch with up to about 2% active chlorine; the treatment percentages being by weight based on the starch.

2. The product of claim 1, wherein the caseinate is sodium, potassium or calcium caseinate or mixtures thereof and wherein the replacement is from 25 to 80% by weight.

3. The product of claim 1, wherein the pregelatinized starch is a drum-dried, jet-cooked, or jet-cooked, spray-dried starch, the starch being corn, potato, or tapioca starch or a mixture thereof with a waxy starch, the starch mixture having a total amylose content of about 15% or above.

4. The product of claim 3, wherein the starch has an amylose content of about 20 to 30% and a WF of about 20–80.

5. The product of claim 4, wherein the starch is a 20–80 WF corn, potato or tapioca starch; a 20–80 WF corn, potato, or tapioca starch derivative prepared by treatment of the starch with about 1–3% octenylsuccinic anhydride, about 0.25–2% propylene oxide, or a sufficient amount of acetic anhydride to provide about 0.13–1.6% bound acetyl; or a 40–80 WF oxidized potato starch prepared by treatment of the starch with about 0.5–1.5% active chlorine.

6. An imitation cheese product which is functionally equivalent to a caseinate-based imitation cheese product selected from the group consisting of mozzarella cheese, cheddar cheese, and processed American cheese, which comprises water, an edible vegetable fat or vegetable oil, cheese additives, and a mixture of about 20–80% by weight of sodium and calcium caseinate and about 80–20% by weight of an edible modified starch, the starch being a pregelatinized converted starch having a water fluidity of about 5–90 and an amylose content of about 15% to below about 40% by weight, or a derivative thereof prepared by treatment of the starch with up to about 10% propylene oxide, up to about 2% succinic anhydride, up to about 3% octenylsuccinic anhydride, a sufficient amount of acetic anhydride to provide a maximum of about 2.5% bound acetyl, or a sufficient amount of sodium or potassium orthophosphate, sodium or potassium tripolyphosphate, or mixture thereof to provide a maximum of about 0.4% bound phosphate, or a moderately crosslinked product thereof prepared by treatment of the starch with phosphorus oxychloride, epichlorohydrin, sodium trimetaphosphate, or adipic-acetic anhydride, or a derivatized moderately crosslinked starch; the converted starch being a fluidity starch prepared by acid- or enzyme-conversion of the starch or an oxidized starch prepared by treatment of the starch with up to about 2% active chlorine; the treatment percentages being by weight based on the starch.

7. The product of claim 6, wherein the mixture is about 50–75% of the caseinates and about 50–25% of the starch and wherein the starch-caseinate mixture comprises 20–30% by weight of the total cheese product.

8. The product of claim 7, wherein the ratio of sodium to calcium caseinate is about 10–50:90–50.

9. The product of claim 6, wherein the pregelatinized starch is a drum-dried, jet-cooked, or jet-cooked, spray-dried starch, the starch being a corn, potato, or tapioca starch or a mixture thereof with a waxy starch, the starch mixture having a total amylose content of about 15% or above.

10. The product of claim 9, wherein the starch is a 20–80 WF corn, potato, or tapioca starch; a 20–80 WF corn, potato, or tapioca starch derivative prepared by treatment of the starch with about 1–3% octenylsuccinic anhydride, about 0.25–2% propylene oxide, or a sufficient amount of acetic anhydride to provide about 0.13–1.6% bound acetyl; or a 40–80 WF oxidized potato starch prepared by treatment of the starch with about 0.5–1.5% active chlorine; or a 20–80 WF corn, potato, or tapioca starch crosslinked with up to 0.06% phosphorus oxychloride and derivatized by treatment of the starch with up to 3% octenylsuccinic anhydride or up to 2% propylene oxide.

11. The product of claim 6, wherein the product is an imitation mozzarella cheese product; wherein the caseinate mixture is a mixture of 70% sodium caseinate and 30% calcium caseinate or of 30% sodium caseinate and 70% calcium caseinate; and wherein the starch is a 20–80 WF corn, potato, or tapioca starch; a 20–80 WF corn, potato, or tapioca starch derivative prepared by treatment of the starch with about 1–3% octenylsuccinic anhydride, about 0.25–2% propylene oxide, or a sufficient amount of acetic anhydride to provide about 0.13–1.6% bound acetyl; or a 40–80 WF oxidized potato starch prepared by treatment of the starch with about 0.5–1.5% active chlorine.

12. The product of claim 11, wherein the caseinate mixture is 30% sodium and 70% calcium caseinate present in an amount of about 50 to 75%.

13. The product of claim 11, wherein the mozzarella cheese product is substantially equivalent in shred, melt, and string to an imitation mozzarella cheese containing no caseinate replacement; and wherein the starch is a 40–60 WF corn starch derivative prepared by treatment of the starch with about 1–3% octenylsuccinic anhydride, a 40–80 WF oxidized potato starch prepared by treatment of the starch with about 0.5–1.5% active chlorine, or a 60–70 WF crosslinked corn starch derivative prepared by treatment of the starch with up to 0.05% phosphorus oxychloride and up to 1.5% octenylsuccinic anhydride, the starch being present in an amount of about 25–50%.

14. The product of claim 11, wherein the mozzarella cheese product is equivalent in shred, melt, and string to an imitation mozzarella cheese containing no caseinate replacement; wherein the caseinate mixture is 30% sodium caseinate and 70% calcium caseinate; and wherein the starch is a 35–50 WF corn starch derivative prepared by treatment of the starch with 1–2% octenylsuccinic anhydride or a 65–70 WF crosslinked corn starch derivative prepared by treatment of the starch with up to 0.01% phosphorus oxychloride and 1–2% octenylsuccinic anhydride.

15. In a method for preparing an imitation cheese product from water, a melted vegetable fat or a vegetable oil, an edible caseinate, and cheese additives, the step which comprises replacing part of the caseinate, in an amount up to about 80% by weight, with an edible modified starch, the water and melted fat or oil being gelled and emulsion-stabilized by the caseinate-starch mixture; the starch being a pregelatinized converted starch having a water fluidity of about 5–90 and an amylose content of about 15% to below about 40% by weight; a derivative thereof prepared by treatment of the starch with up to about 10% propylene oxide, up to about 2% succinic anhydride, up to about 3% octenylsuccinic anhydride, a sufficient amount of acetic anhydride to provide a maximum of about 2.5% bound acetyl, or a sufficient amount of sodium or potassium orthophosphate, sodium or potassium tripolyphosphate, or mixture thereof to provide a maximum of about 0.4% bound phosphate; or a moderately crosslinked product thereof prepared by treatment of the starch with phosphorus oxychloride, epichlorohydrin, sodium trimetaphosphate, or adipic-acetic anhydride; or a derivatized moderately crosslinked starch; the converted starch being a fluidity starch prepared by acid- or enzyme-conversion of the starch or an oxidized starch prepared by treatment of the starch with up to about 2% active chlorine; the treatment percentages being by weight based on the starch.

16. The method of claim 15, wherein the imitation cheese product is a mozzarella cheese, cheddar cheese, or processed American Cheese.

17. The method of claim 16, wherein the caseinate is a mixture of sodium and calcium caseinate in a ratio of about 10–50:90–50.

18. The method of claim 17, wherein the caseinate is a mixture of 70% sodium caseinate and 30% calcium caseinate or 30% sodium caseinate and 70% calcium caseinate.

19. The method of claim 18, wherein the pregelatinized starch is a drum-dried, jet-cooked, or jet-cooked, spray-dried starch, the starch being a 20–80 WF corn, potato, or tapioca starch; a 20–80 WF corn, potato, or tapioca starch derivative prepared by treatment of the starch with about 1–3% ocetenylsuccinic anhydride, about 0.25–2% propylene oxide, or a sufficient amount of acetic anhydride to provide about 0.13–6% bound acetyl; or a 40–80 WF oxidized potato starch prepared by treatment of the starch with about 0.5–1.5% active chlorine; or a 20–80 WF crosslinked corn, potato, or tapioca starch derivative prepared by treatment of the starch with up to 0.06% phosphorus oxychloride and up to 3% octenylsuccinic anhydride.

20. The method of claim 19, wherein the starch is a 35–50 WF corn starch derivative prepared by treatment of the starch with about 1–2% octenylsuccinic anhydride.

* * * * *